US 12,304,740 B2

(12) United States Patent
Bringewatt et al.

(10) Patent No.: US 12,304,740 B2
(45) Date of Patent: May 20, 2025

(54) METHOD AND APPARATUSES FOR FEEDING ITEMS OF LAUNDRY TO A LAUNDRY MACHINE, SUCH AS IN PARTICULAR A MANGLE

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 573 days.

(21) Appl. No.: 17/689,074

(22) Filed: Mar. 8, 2022

(65) Prior Publication Data

US 2022/0289488 A1 Sep. 15, 2022

(30) Foreign Application Priority Data

Mar. 11, 2021 (DE) .......................... 102021105998.4
Jul. 21, 2021 (DE) .......................... 102021118894.6

(51) Int. Cl.
B65G 17/20 (2006.01)
B65G 17/32 (2006.01)
(Continued)

(52) U.S. Cl.
CPC ........... B65G 17/20 (2013.01); B65G 17/323 (2013.01); B65G 43/08 (2013.01); D06F 45/16 (2013.01);
(Continued)

(58) Field of Classification Search
CPC ...... B65G 17/20; B65G 17/323; B65G 43/08; B65G 2203/0225; B65G 2203/0283;
(Continued)

(56) References Cited

U.S. PATENT DOCUMENTS 3,911,604 A * 10/1975 Sjostrom ................. D06F 67/04
38/143
4,313,269 A * 2/1982 van Rumpt ............ B65G 9/002
38/143

(Continued)

FOREIGN PATENT DOCUMENTS

DE         4143070 A1    7/1993
DE    102007040465 B3    2/2009
(Continued)

OTHER PUBLICATIONS

European Patent Office, Office Action in a related application), Aug. 30, 2022.

(Continued)

*Primary Examiner* — Ismael Izaguirre
(74) *Attorney, Agent, or Firm* — Laurence P. Colton; Smith Tempel Blaha LLC

(57) ABSTRACT

Laundry items are spread out and deposited on a feed conveyor which inserts the laundry item into a mangle. The front edge of the laundry item is stretched by a spreading device, wherein spreading clamps are moved apart on the basis of a measured length of the front edge. Until now, the front edge length item has been measured at the spreading device, which increases the duration of the spreading operation. The invention measures the front edge length upstream of the spreading device when the laundry item is still hanging in two loading clamps of a loading station. So that the front edge length can be contactlessly determined from the lowest point of the sag of the front edge, the distance between the loading clamps is a greater distance than previously. As a result, a V-like sag is formed, the lowest point of which can be contactlessly determined.

25 Claims, 7 Drawing Sheets

(51) Int. Cl.
  *B65G 43/08* (2006.01)
  *D06F 45/16* (2006.01)
  *D06F 95/00* (2006.01)
(52) U.S. Cl.
  CPC ...... *D06F 95/00* (2013.01); *B65G 2203/0225* (2013.01); *B65G 2203/0283* (2013.01)
(58) Field of Classification Search
  CPC .......... D06F 45/16; D06F 95/00; D06F 71/38; D06F 67/04
  See application file for complete search history.

(56) References Cited

U.S. PATENT DOCUMENTS

| | | | | |
|---|---|---|---|---|
| 4,774,505 A | * | 9/1988 | Ueda | D06F 67/04 38/143 |
| 5,515,627 A | * | 5/1996 | McCabe | D06F 67/04 38/143 |
| 9,187,253 B2 | * | 11/2015 | Olivieri | B65G 17/20 |
| 9,909,252 B2 | * | 3/2018 | Bringewatt | B65G 47/90 |
| 2019/0352839 A1 | * | 11/2019 | Regier | D06F 67/04 |

FOREIGN PATENT DOCUMENTS

| | | |
|---|---|---|
| DE | 102017000209 A1 | 7/2018 |
| DE | 102018003875 A1 | 11/2019 |
| DE | 102018006466 A1 | 11/2019 |
| EP | 0982428 A1 | 3/2000 |
| EP | 2784208 B1 | 1/2020 |
| JP | 2007092255 A | 4/2007 |
| JP | 2019154462 A | 9/2019 |
| WO | 2009118643 A1 | 10/2009 |
| WO | 2018130418 A1 | 7/2018 |

OTHER PUBLICATIONS

Deutsches Patent-Und Markenamt (German Patent and Trademark Office), Rechercebericht (search in a related application), Mar. 21, 2022.

* cited by examiner

METHOD AND APPARATUSES FOR FEEDING ITEMS OF LAUNDRY TO A LAUNDRY MACHINE, SUCH AS IN PARTICULAR A MANGLE

CROSS REFERENCE TO RELATED APPLICATIONS

This patent application claims priority on and the benefit of German Patent Application No. 10 2021 105 998.4 having a filing date of 11 Mar. 2021 and German Patent Application No. 10 2021 118 894.6 having a filing date of 21 Jul. 2021.

BACKGROUND OF THE INVENTION

Technical Field

The invention relates to a method for feeding items of laundry to a laundry machine, such as in particular a mangle, and to apparatuses for feeding items of laundry to a laundry machine, such as in particular a mangle.

Prior Art

Apparatuses of the type discussed here are referred to in technical jargon as "insertion machines". The latter serve to spread out items of laundry and to feed them in the feeding direction in the spread-out state, with the stretched-out front edge in front, to the mangle or to another laundry machine. In the process, the stretched front edge of the item of laundry runs transversely with respect to the feeding direction.

Insertion machines are known which have at least one loading station with two loading clamps forming a pair, and a spreading device following the loading station in the feeding direction and having at least one pair of spreading clamps. Corners delimiting the front, transversely directed edge of the item of laundry on both sides are suspended manually or in an automated manner by, for example, a handling device in the two loading clamps of the respective loading station and are transferred from the loading clamps to the spreading clamps or are taken over from the loading clamps by the spreading clamps. The spreading clamps can be moved apart transversely with respect to the feeding direction until the front, transversely directed edge of the item of laundry is sufficiently stretched. This results in spreading out of the item of laundry. The spread-out item of laundry is then subsequently deposited directly onto a feed conveyor or a depositing strip which transfers the item of laundry to the feed conveyor.

In the case of the known insertion machines, a measurement of the length of the front edge of the item of laundry takes place in the region of the spreading device before said front edge is fully stretched out, in order, on the basis of said stretching out, to move the spreading clamps apart in a targeted manner until the front edge of the item of laundry is sufficiently stretched. The measurement of the length of the front edge of the item of laundry suspended in the spreading clamps extends the spreading operation of the front edge of the item of laundry in the spreading device, which has an adverse effect on the feeding rate of items of laundry to the mangle or to another laundry machine.

BRIEF SUMMARY OF THE INVENTION

Starting from the above, the invention is based on the object of providing a method and an apparatus for feeding items of laundry to a laundry machine, such as in particular a mangle, which increases the feeding rate of items of laundry to the mangle or to another laundry machine.

A method for achieving the object is a method for feeding items of laundry to a laundry machine, such as in particular a mangle, with opposite corners of a front edge, running transversely with respect to the feeding direction, of a respective item of laundry being suspended in two loading clamps from which the item of laundry is transferred to spreading clamps, which are movable transversely with respect to the feeding direction, of a spreading device or is taken over by the spreading clamps, the spreading clamps are moved apart in order to spread out the item of laundry by stretching the front edge of same, and the spread-out item of laundry is deposited by the spreading clamps on a depositing strip or on a feed conveyor which transports the spread-out item of laundry to the mangle or to another laundry machine, wherein the two loading clamps holding the opposite corners of the respective item of laundry are at such a large or relatively large distance from one another or can be brought to such a distance from one another that, when the item of laundry is hanging down from the two loading clamps, a V-like sag of the front edge forms, an at least approximately lowest point of the V-like sag is contactlessly determined and the length of the sagging front edge of the item of laundry is derived therefrom.

According thereto, the front edge, running transversely with respect to the feeding direction, of the item of laundry is already measured upstream of the spreading device, namely in the region of the respective loading station. The opposite corners of the front edge of the item of laundry are then suspended on a pair of loading clamps of the respective loading station. The sag of the front edge of the item of laundry is determined contactlessly, for example optoelectronically, at the respective loading station. Since the sag of the item of laundry is then still relatively large, the front edge in the case of above all relatively large items of laundry is not yet formed in a manner so that it can be reliably detected since, for example, it is twisted. This does not permit contactless measurement of the front edge. Therefore, a relatively great distance between the loading clamps is provided. The distance is so much greater than previously that a V-like profile of the front edge of the item of laundry arises in every case, especially also in the case of relatively large items of laundry. As a result, the sag of the front edge of the item of laundry can be at least approximately contactlessly determined in the respective loading station. This also makes it possible to contactlessly measure items of laundry of differing sizes that have not been sorted.

It is preferably provided that, at the distance of the loading clamps from one another or with respect to one another that exists during the detection of the sag, the item of laundry is transferred from the loading clamps to the spreading clamps or the item of laundry is taken over from the loading clamps by spreading clamps. Since the front edge, namely the front transverse edge, is measured when the distance between the loading clamps is greater or increased, since they are at a sufficiently large distance for forming the V-like sag, the front transverse edge is as it were already initially stretched or pre-stretched, but not yet completely and/or sufficiently stretched in either case. If, then, when the loading clamps are at a relatively great distance, the item of laundry is transferred or taken over by the spreading device, the spreading clamps thereof can already be at a correspondingly larger distance from one another, which reduces the travel distance of the spreading clamps for stretching the front edge of the item of laundry. This reduces the duration of the spreading operation.

An advantageous possibility of refining the method makes provision for the lowest point or at least the approximately lowest point of the sag of the front edge of the item of laundry suspended by the loading clamps, which are at a relatively great distance from one another, to be measured contactlessly optoelectronically. This can preferably take place by means of an imaging device, such as, for example, a camera or a line scan camera or a sensor strip or a laser fan or a laser curtain. Such contactless measuring methods can be carried out rapidly and highly reliably and supply data, preferably digital data, which permit an automatic computational determination of the width and/or length of the front edge, in particular front transverse edge, of the item of laundry on the basis of the contactlessly determined lowest point or approximately lowest point of the sag of the item of laundry suspended in the loading clamps.

An advantageous possibility of developing the method makes provision for the distance of the determined lowest point of the V-like sag of the front edge of the item of laundry, when the latter is suspended on the loading clamps, to be determined with respect to an imaginary straight connecting line between the adjacent loading clamps respectively holding one of the opposite corners of the V-shaped sagging front edge of the item of laundry, in particular the clear or outer distance between same. From said distance, especially taking into account the distance between the two loading clamps, the length of the front edge of the item of laundry can be automatically determined. Thus, taking into account the contactless optoelectronic measurement of the sag of the front edge of the item of laundry suspended from the loading clamps, the length of the front edge of the item of laundry suspended from the loading clamps can be reliably determined, preferably computationally, upstream of the spreading device. This applies especially also for relatively large items of laundry.

It is conceivable that the distance between the two loading clamps, forming a pair of loading clamps, of the respective loading station is smaller, when adjacent corners of the front edge of the item of laundry are suspended, than during the contactless determination of the V-like sag of the front edge of the item of laundry, said determination still taking place in the region of the respective loading station. As a result, the loading clamps of the respective loading station for suspending adjacent corners of the item of laundry are still close together, as previously customary, which may possibly facilitate the manual, but also automated suspension of adjacent corners of the front edge of the item of laundry in the two loading clamps of the respective loading station. Then, after the adjacent corners of the front edge of the item of laundry are suspended, the adjacent loading clamps of the respective pair of loading clamps are moved apart, specifically until the distance between them is increased to such a great extent that the front edge of the item of laundry hangs down from the loading clamps with a V-like sag, i.e., in contrast to loading clamps located tightly next to one another, the front edge of the item of laundry is no longer twisted. After the loading clamps are moved apart, or by the loading clamps being moved apart, a V-like sag is then formed which permits the contactless measurement of the still sagging, but less than originally sagging, front edge, especially of its at least approximately lowest point.

As an alternative, it is, however, also conceivable to provide the pair of loading clamps in the respective loading station at a fixed, invariable distance from one another. This distance is then larger than hitherto customary, as a result of which, when the items of laundry, specifically also large items of laundry, are suspended on the loading clamps, there is reliably a measurable V-like profile of the sag of the front edge of the item of laundry. Given such a fixed, relatively large distance between the loading clamps, the latter can be constituent parts of a multiple clamp.

The inserting or suspending of opposite corners of the front edge, in particular front transverse edge, of the respective item of laundry in two loading clamps of the relevant loading station can take place (manually) by one or more operators, but also in an entirely or partially automated or mechanized manner, for example by means of at least one handling device, a robot, transport devices or the like.

According to an advantageous possibility of refining the method, it is provided to collect together a plurality of loading clamps at each loading station to form a group. Such a group cannot only have two identical loading clamps, but also more than two identical loading clamps. Such a group of a plurality of loading clamps is then a multiple clamp with two, three or else more than three loading clamps.

A multiple clamp with three preferably identical loading clamps has two outer loading clamps and an inner loading clamp arranged in between. The inner loading clamp can be arranged centrally between the outer loading clamps, but also slightly excentrically. In the case of such a multiple clamp, the opposite corners of a front edge of the respective item of laundry can be suspended either in the two outer loading clamps or in one outer loading clamp and the inner loading clamp. In particular, the inner loading clamp is used for smaller items of laundry, for example serviettes, the adjacent edge corners of which are not at such a large distance as the outer loading clamps. When the inner loading clamp is arranged centrally between the outer loading clamps, two selection possibilities are produced because the outer loading clamps are equally far away from the central, inner loading clamp. If the inner clamp is arranged excentrically between the outer clamps, different distances are provided between the outer loading clamps and the inner loading clamp.

It can furthermore be provided that at least one loading clamp of each group of a plurality of loading clamps of the multiple clamp is assigned a means which establishes whether a corner of the item of laundry is located in the relevant loading clamp. If said means outputs a signal, this means that a corner is present in the relevant loading clamp, while a lack of a signal indicates that a corner is not present in the relevant loading clamp, or vice versa. The means can be a contact, scanner, sensor, light barrier or else a camera. It is preferably provided that each loading clamp, i.e., all the loading clamps of a multiple clamp, is assigned such a means. Especially in the case of multiple clamps with three or more loading clamps, the information can be obtained by the means, assigned at least to the inner loading clamp, for establishing the presence of a corner in said loading clamp, that the inner loading clamp is occupied by a corner of an item of laundry, the latter having to be a small item of laundry, the edge of which is smaller than the distance between the outer loading clamps. The controller can then process this signal to the effect that a small item of laundry with only a slightly sagging front edge is held in an outer and inner loading clamp. On the basis of this information, the length of the front edge of the item of laundry then does not need to be determined because it is to be assumed that the spreading distance of such small items of laundry by the spreading device is only small.

An apparatus for achieving the object stated at the beginning is an apparatus for feeding items of laundry to a laundry machine, such as in particular a mangle, having at least one loading station having at least two loading clamps, a spreading device which has spreading clamps movable transversely with respect to a feeding direction, and at least one feed conveyor transporting the items of laundry in the feeding direction to the mangle or to another laundry treatment device, wherein the two loading clamps of the or each loading station are at such a large distance from one another or can be brought to such a distance that, when the respective item of laundry is hanging by opposite corners of a front edge on the loading clamps, a V-like sag of the front edge of the item of laundry arises, and at least one contactless measuring device is provided by means of which a lowest point or at least approximately the lowest point of the V-like sag can be determined.

Provision is made in this apparatus to provide the two loading clamps of the loading station or the respective loading station at a relatively great distance at least for measuring the length of the sagging front edge of the item of laundry. A relatively great distance should be understood as meaning a distance which is significantly greater than the previously customary distance between the loading clamps of a respective pair of loading clamps. The relatively great or increased distance between the loading clamps of each loading station is at least 1½ times to 3 times the average previous distances between loading clamps of known insertion machines. The relatively great distance between the loading clamps causes the formation of a defined V-like sag under loading clamps holding the adjacent corners of the front edge, even in the case of large items of laundry. This sag, in particular the lowest point or at least virtually lowest point of same, can be reliably contactlessly determined, preferably measured, by a measuring device, in particular optoelectronic measuring device. From this, preferably computationally, the length of the front edge, in particular front transverse edge, of items of laundry of any size can be reliably and automatically determined with sufficiently precise measuring results in the region of the loading station, i.e., upstream of the spreading device.

A refinement of the apparatus is conceivable, in which the two adjacent loading clamps, holding adjacent corners of the respective item of laundry, of the or each loading station are at a fixed distance from one another. This distance is increased in relation to previous apparatuses of this type (insertion machines). The distance between the loading clamps of the respective, in particular each, pair of loading clamps is preferably increased to such an extent that even the sag of large items of laundry assumes a defined or definable V-shaped form.

The distance between the two loading clamps of the respective pair of loading clamps at the respective loading station is preferably 350 mm to 600 mm. A distance of 400 mm to 500 mm is particularly advantageous. By contrast, the clear distances between the two loading clamps of each loading station in the case of known apparatuses were on average only approximately 200 mm. The effect achieved by the at least 1.5 times as large clear distance between the loading clamps of the respective pair of loading clamps is that the sag of the item of laundry forming between opposite corners of the front edge has a defined, in particular V-shaped or optionally also U-like form, even in the case of large items of laundry. A sag with such a defined form can be reliably and sufficiently exactly determined contactlessly with in particular optoelectronic means. Especially, the lowest point of the sag or at least approximately lowest point of the sag can thus be determined and/or measured reliably and sufficiently precisely contactlessly.

It is conceivable for the two loading clamps, holding two adjacent corners of the respective item of laundry, of the respective loading station to form a double clamp. The adjacent loading clamps are then at an invariable, fixed distance from one another. Operators then insert the opposite corners of the front edge of the item of laundry at a correspondingly greater distance into the loading clamps. It has been shown that such a suspension of the opposite corners of the respective item of laundry in the loading clamps is ergonomically favorable since the respective operator with arms oriented parallel holds the respective corners at a distance which corresponds or at least approximately corresponds to the increased distance according to the invention of the loading clamps of the respective pair of loading clamps. The respective operator therefore needs neither to move together their arms and hands nor move them further apart than ergonomically pleasant in order to suspend the adjacent corners of the front edge of the respective item of laundry in the pair of loading clamps of the respective loading station.

Alternatively, it is, however, also conceivable to design the distances between the loading clamps of the respective loading station to be variable. At least one loading clamp of each loading station is then mounted movably on a clamp body. The change in the distance between the loading clamps of the pair of loading clamps can be such that the minimum distance is smaller than 350 mm and the maximum distance is up to 600 mm, preferably up to 500 mm. As a result, for example, the distance between the loading clamps of the respective pair of loading clamps for suspending the corners, delimiting the front transverse edge of the respective item of laundry on either side, in the loading clamps can take place with a previously customary smaller distance, while this distance, after the item of laundry is suspended in the loading clamps, but before the measuring operation of the sag of the front edge, is increased to the greater distance which can be 1½ times to 3 times the small distance. The measurement of the sagging front edge can thus reliably take place at a V-like sag forming at a relatively great distance between the loading clamps, the distance arising after the loading clamps are moved apart, while the suspending of adjacent corners of the front edge of the item of laundry can take place at a customary smaller distance between the adjacent loading clamps of each pair of loading clamps.

An alternative apparatus for achieving the object mentioned at the beginning is an apparatus for feeding items of laundry to a laundry machine, such as in particular a mangle, having at least one loading station having loading clamps, a spreading device which has spreading clamps which are movable transversely with respect to a feeding direction, and at least one feed conveyor transporting the items of laundry in the feeding direction to the mangle or to another laundry treatment device, wherein each loading station has a group with at least three loading clamps. This can alternatively or additionally also involve preferred developments of the previously described apparatus and of the claims directed thereto. Accordingly, it is provided that each loading station has at least one group with at least three loading clamps. As a result, adjacent corners of a front edge of a respective item of laundry can optionally be suspended in two selected loading clamps of the group of at least three loading clamps. Since the at least three loading clamps of the respective group are at least partly at different distances from one another, smaller items of laundry can be suspended in loading clamps which are less spaced apart, preferably an outer and the inner loading clamp, while larger items of laundry can be suspended by the opposite corners of their front edge in outer loading clamps which are at a maximum distance from one another.

The loading clamps of the respective group are preferably arranged on a multiple clamp or form such a multiple clamp. The loading clamps of the multiple clamp are preferably connected to one another. Such a connection can take place fixedly, and therefore the distances between the loading clamps of the respective group cannot be changed among one another.

According to an advantageous refinement of the apparatus, the respective multiple clamp has two outer loading clamps and at least one inner loading clamp arranged in between. If the multiple clamp has three preferably identical loading clamps, the inner loading clamp can be arranged centrally between the outer clamps, but also excentrically. In the case of an excentrically arranged inner loading clamp, the outer loading clamps are at the greatest distance from one another while the inner loading clamp is at differently large distances from the outer loading clamps by the inner loading clamp having a different distance with respect to one outer loading clamp than with respect to the other outer loading clamp. As a result, differently sized items of laundry can be suspended by opposite corners of a front edge in selected loading clamps of the multiple clamp, in particular even small items of laundry can be suspended in the multiple clamp, the distance between adjacent corners of the front edge of said items of laundry being smaller than the distance between the outer loading clamps.

It is conceivable for the or each inner loading clamp to be displaceably assigned to the multiple clamp. It is then possible to change the distances of the respective inner loading clamp from the outer loading clamps as required.

BRIEF DESCRIPTION OF THE DRAWINGS

Preferred exemplary embodiments of the invention will be explained in more detail below with reference to the drawing, in which.

DETAILED DESCRIPTION OF PREFERRED EMBODIMENTS

Figure 1:
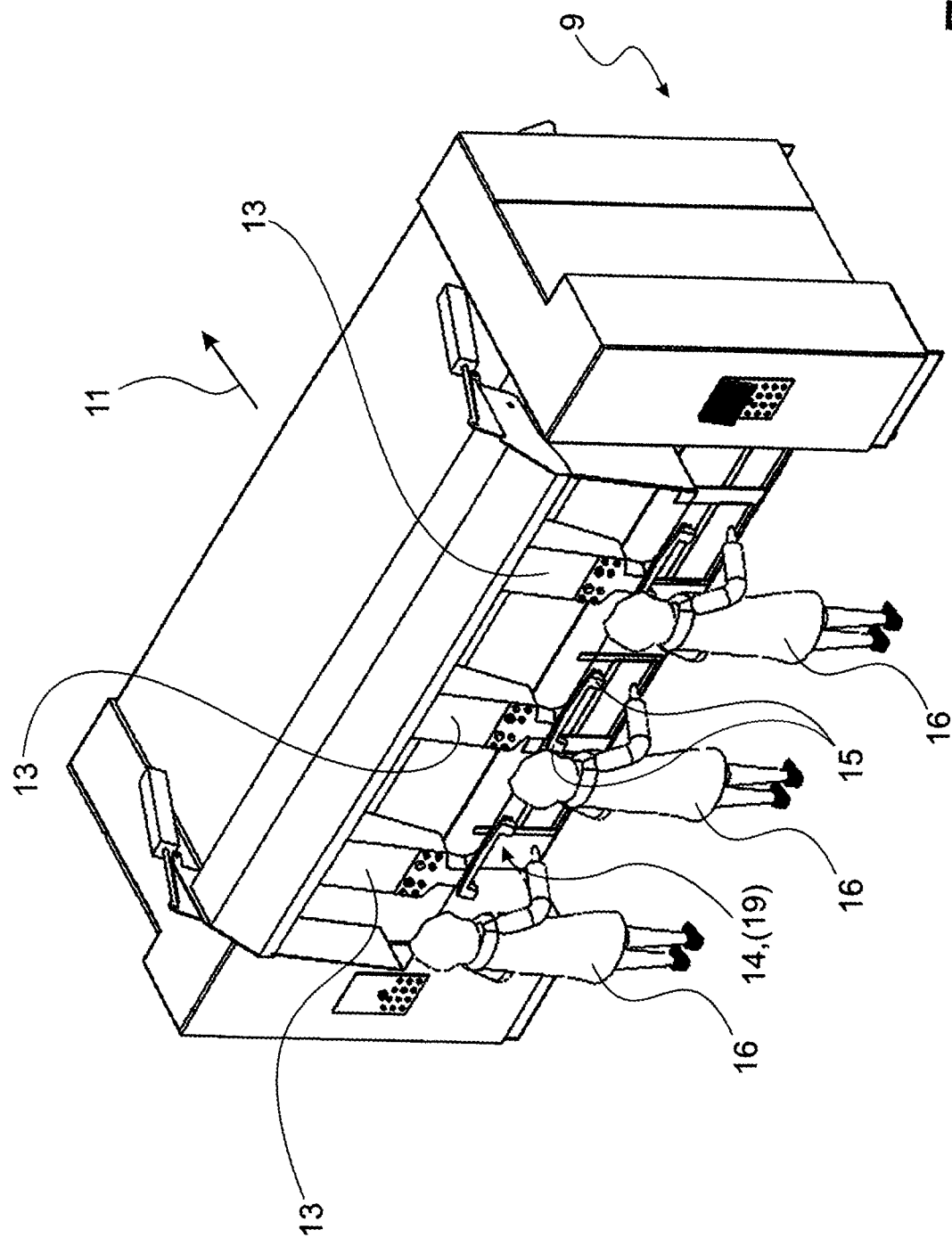
FIG. 1 shows a perspective view of an apparatus according to a first exemplary embodiment.
Figure 2:
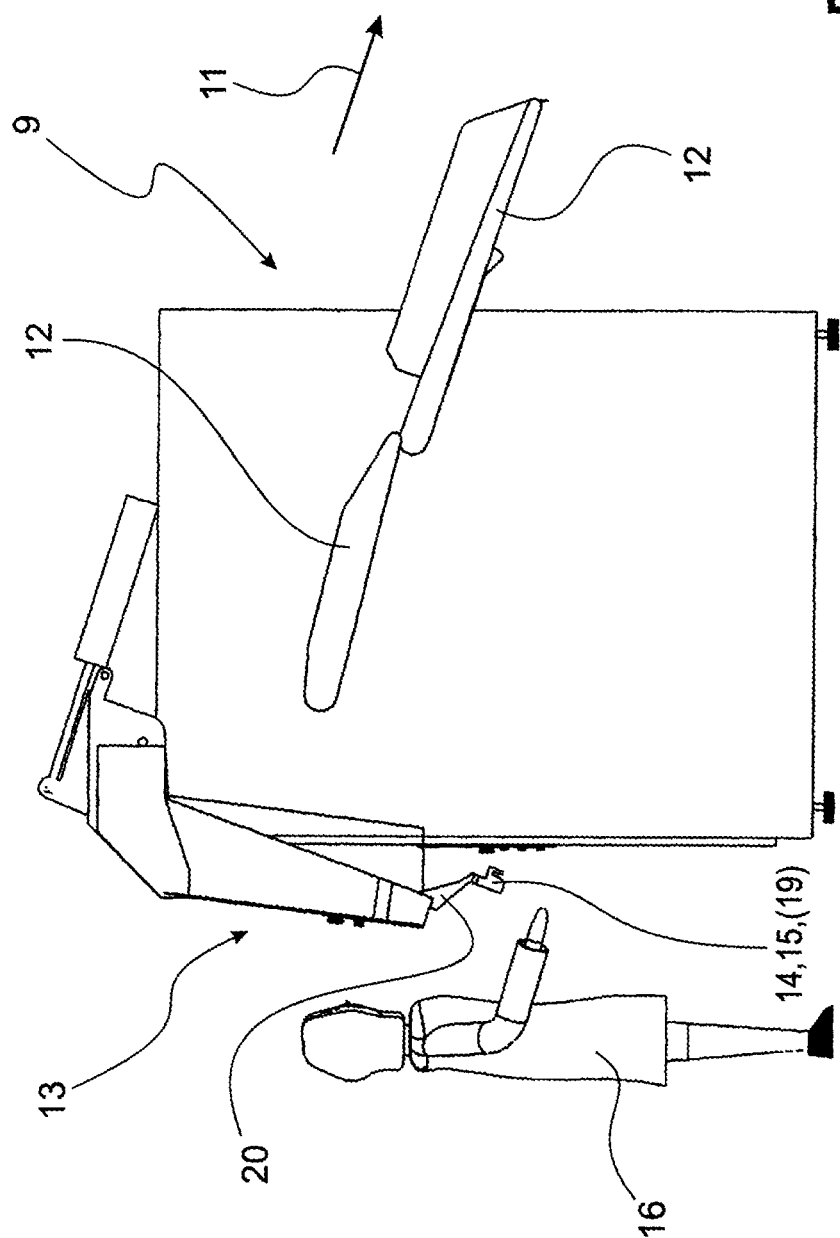
FIG. 2 shows a side view of the apparatus of FIG. 1.
Figure 3:
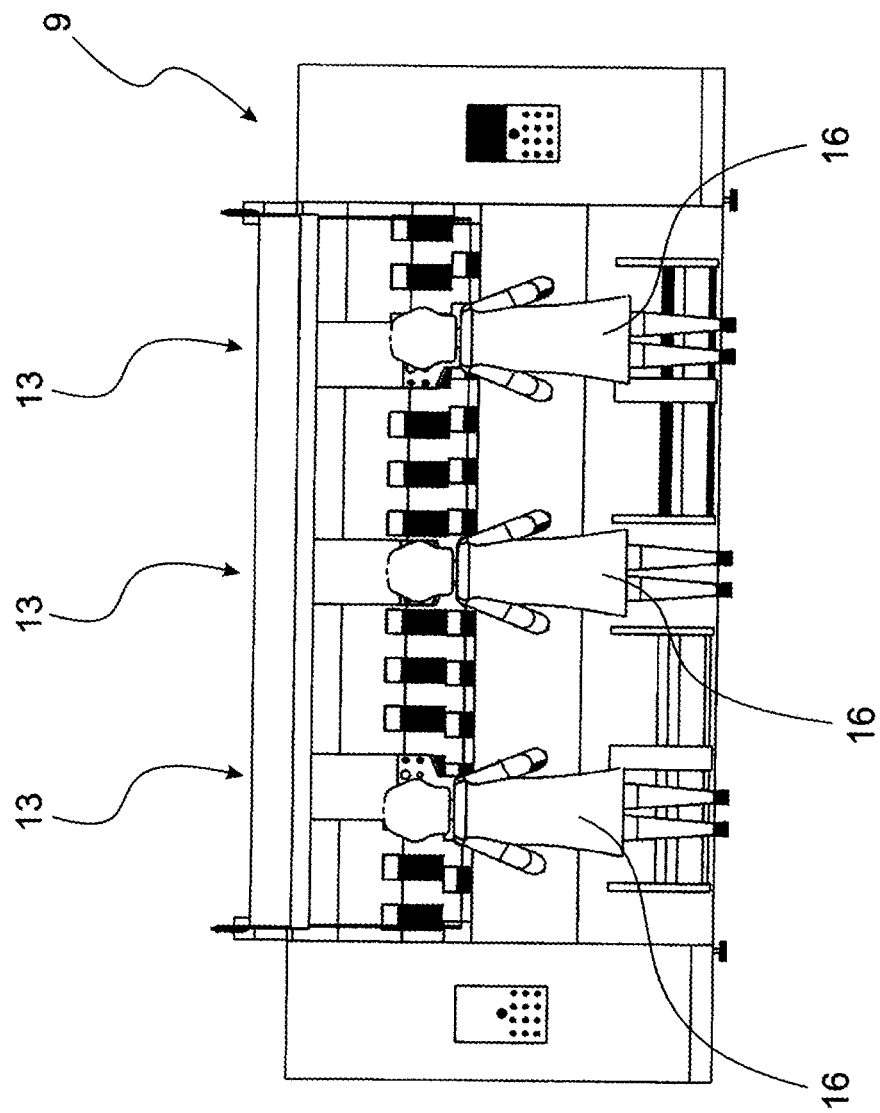
FIG. 3 shows a front view of the apparatus of FIG. 1.

The figures show an apparatus configured in the form of an insertion machine 9. The apparatus or insertion machine 9 serves to spread out items of laundry 10, shown in some figures, specifically in particular consecutive items of laundry 10 of differing size that have not been sorted, and to feed same in the spread-out state to a mangle, not shown in the figures, or to another laundry treatment device, for example a folding machine.

The items of laundry 10 are preferably what are referred to as flat items of laundry. These include bed linen, especially bed covers, pillowcases and sheets, but also table linen, such as, for example, tablecloths, place mats and serviettes.

The mangle or another laundry treatment device is arranged downstream of the insertion machine 9, as seen in the feeding direction 11. The insertion machine 9 has at least one feed conveyor 12 which is formed by a belt conveyor and transports a respectively spread-out item of laundry 10 or, in the case of apparatuses of multi-track design, also a plurality of smaller items of laundry 10 lying next to one another on multiple tracks in the feeding direction 11 to the mangle or to another laundry treatment machine.

A plurality of preferably identical loading stations 13 are arranged on a front side or upstream of the apparatus. The apparatus shown in FIGS. 1 to 6 has three loading stations 13 spaced apart uniformly from one another. However, the invention is not restricted thereto. The apparatus can have more than three or else fewer than three loading stations 13, optionally also just one single loading station 13.

Each of the preferably identical loading stations 13 has a pair of loading clamps 14 with two preferably identical loading clamps 15. In the case of the apparatus shown in the figures, an operator 16 is assigned to each loading station 13. The operator 16 inserts opposite or adjacent corners 17 of a front edge 18 of the respective item of laundry 10 into one of the two loading clamps 15 of the pair of loading clamps 14 of that loading station 13 in front of which said operator is currently located. The adjacent corners 17 of the front edge 18 of the respective item of laundry 10 are suspended for this purpose in the loading clamps 15 such that the item of laundry 10 hangs by the corners 17 on the two loading clamps 15 of the pair of loading clamps 14.

The loading clamps 15 shown in FIGS. 1 to 6 are collected together at a fixed, invariable distance to form a multiple clamp which, in this exemplary embodiment, is a double clamp 19. Alternatively, however, the loading clamps may also be separate. The two loading clamps 15 of the pair of loading clamps 14 or the double clamps 19 are carried by a carriage 20 which is movable by a conveyor of the respective loading station 13 on a track rising with respect to the feeding direction 11, with the pair of loading clamps 14 or the double clamp 19 being carried along. The conveyor can be a continuous conveyor, with, for example, a revolving conveyor belt, belt, chain or the like, but also a discontinuous conveyor, for example a shuttle cylinder, which moves the carriage 20 with the pair of loading clamps 14 or the double clamp 19 to and fro in opposite directions.

From the loading position, shown in FIGS. 1 to 6, of the loading clamps 15 of the loading station 13, the carriage 20 with the loading clamps 15 or double clamps 19 assigned thereto is raised into a transfer position of the adjacent corners 17 of the front edge 18 of the item of laundry 10 to a spreading device (not shown) arranged downstream of the loading stations 13, as seen in the feeding direction 11. The spreading device has at least one pair of spreading clamps (likewise not illustrated in the figures) consisting of a plurality of preferably identical spreading clamps. In the case of a spreading device with one pair of spreading clamps, the latter serves all three loading stations 13 in an alternating manner. However, it is also conceivable for the spreading device to have a plurality of pairs of spreading clamps. The spreading clamps of a pair of spreading clamps are movable independently of one another over the entire working width of the apparatus on a horizontal track, preferably a rail, running transversely with respect to the feeding direction 11. The spreading clamps which have been moved together downstream of a respective loading station 13 take over the adjacent corners 17 of the front edge 18 of the respective item of laundry 10 from the raised loading clamps 15 of the respective loading station 13. However, it is also conceivable for the corners of the two loading clamps 15 of the respective pair of loading clamps 14 to be pushed into the two spreading clamps of the pair of spreading clamps.

After the spreading clamps have taken over adjacent corners 17 of the front edge 18, running transversely with respect to the feeding direction 11, of the item of laundry 10, the spreading clamps are moved apart in opposite directions by a corresponding drive of the spreading device in order to stretch out the front edge 18 of the item of laundry 10. This results in the item of laundry 10 being spread out. In addition, the spreading clamps of the respective pair of spreading clamps are moved in such a manner that the respective item of laundry is positioned centrally upstream of the feed conveyor 12 in the case of a mangle or other laundry machine operated with a single track. In the case of mangles or other laundry machines operated with multiple tracks, the spreading clamps move the respective smaller item of laundry centrally upstream of the respective track.

After the spreading clamps have spread out the respective item of laundry 10 and moved same centrally upstream of the respective track of the feed conveyor 12, a front edge region of the item of laundry 10, with the front edge 18 stretched out by the spreading clamps, is either placed directly onto the feed conveyor 12 or placed indirectly onto a depositing strip which subsequently deposits the front edge region of the item of laundry onto the feed conveyor 12.

In a particular manner according to the invention, the distance between the loading clamps 15 of the pair of loading clamps 14 or of the double clamp 19 is of such a large size that the front edge 18 of the respective item of laundry 10 can be measured contactlessly, in particular optoelectronically, at the relevant loading station 13. This measurement takes place at opposite corners 17 of the front edge 18 of the respective item of laundry 10 hanging in adjacent loading clamps 15 of the pair of loading clamps 14. The front edge 18 of the item of laundry 10 still sags here.

Figure 4:
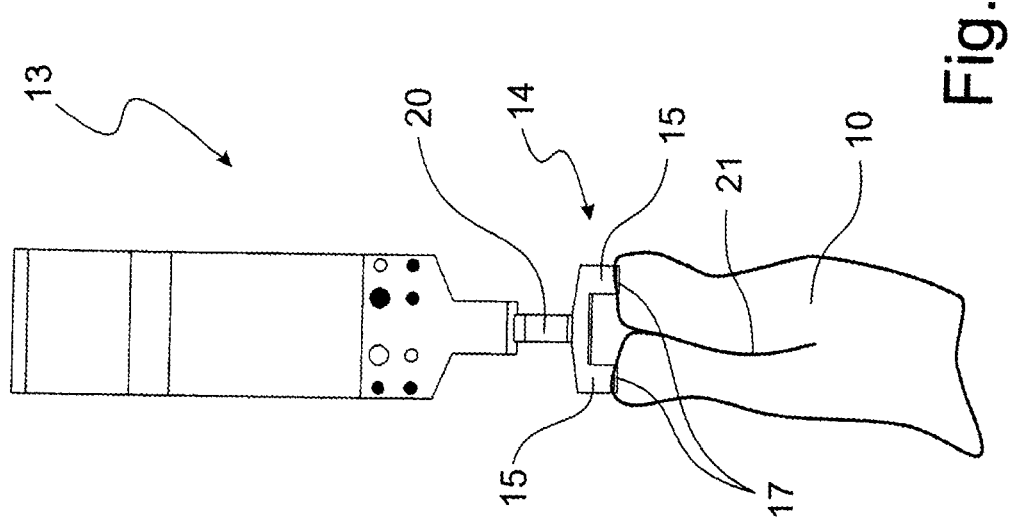
FIG. 4 shows a front view of a loading station of the apparatus of FIGS. 1 to 3 with a pair of loading clamps consisting of two loading clamps arranged closely next to each other according to the prior art.

FIG. 4 shows the loading clamps 15 of the respective pair of loading clamps 14 or of the double clamp 19 that are at only a small distance from one another according to the prior art. FIG. 4 reveals that, when corners 17 at opposite ends of the front edge 18 hang in the loading clamps 15, the sag 21, which forms between the loading clamps 15 lying close together, of the front edge 18 of the item of laundry 10 cannot be seen because the loading clamps 15 are so close together that those parts of the sag 21 which originate from opposite loading clamps 15 overlap and/or are twisted in one another. As a result, the sag 21 is virtually not present. Therefore, this sag 21 cannot at least be measured contactlessly.

Figure 5:
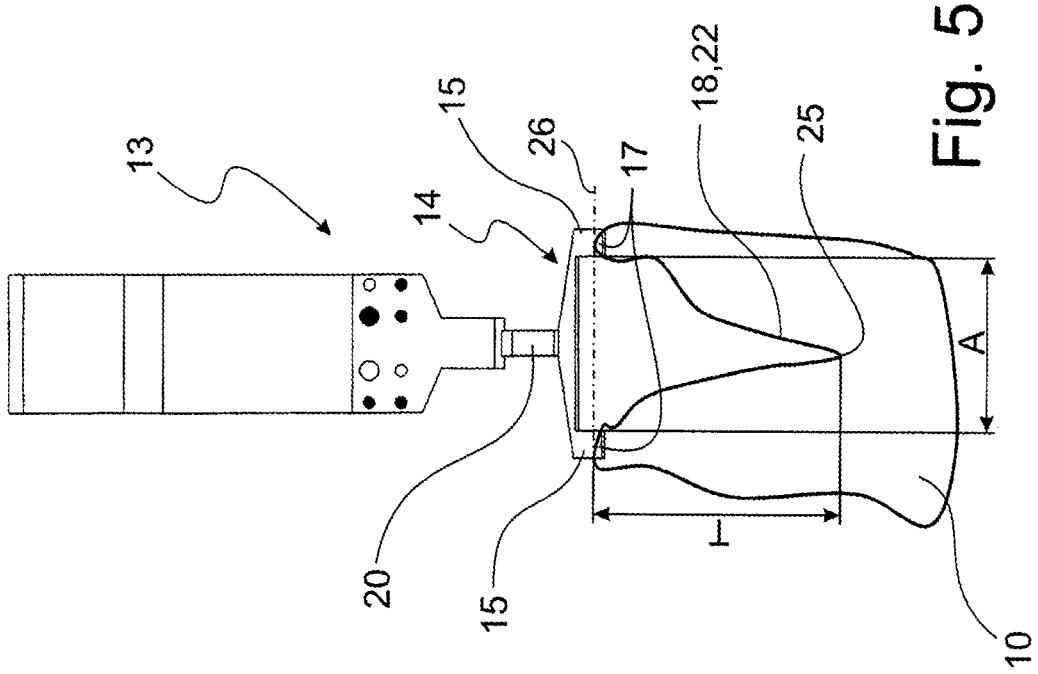
FIG. 5 shows a view according to FIG. 4 with two loading clamps which, according to the invention, are at a relatively great distance from each other.

In comparison thereto, FIGS. 1 and 5 show the pair of loading clamps 14 or the double clamp 19 with an increased distance according to the invention, in particular increased clear distance, between the two loading clamps 15. It can be seen from FIG. 5 that, because of the increased distance between the loading clamps 15 of the pair of loading clamps 14 of the respective loading station 13, the opposite corners 17 of the front edge 18 of the item of laundry 10 that are held in the loading clamps 18 are at a relatively large distance from each other. As a result, especially also in the case of larger items of laundry 10, a clearly recognizable V-like, preferably V-shaped, sag 22 of the front edge 18 is formed between the corners 17 of the front edge 18 of the item of laundry 10, said corners 17 being held on loading clamps 15 which are at an increased distance from one another. This front edge 18 can be determined reliably and relatively precisely contactlessly, in particular optoelectronically.

While the previously customary small distance, shown in FIG. 4, between the loading clamps 15 of the respective pair of loading clamps 14 or of the double clamp 19 lies in the range of 150 mm to 250 mm, the relatively large distance, in particular clear distance, according to the invention and illustrated in FIGS. 1 and 5 is 350 mm to 600 mm, preferably 400 mm to 500 mm. Consequently, the increased distance according to the invention between the adjacent loading clamps 15 is approximately 1.5 to 4 times as large as the previously customary distance.

The loading clamps 15 can be assigned means, not shown in the figures, for establishing the occupancy of the respective loading clamps 15. In particular, the means serve to establish whether a corner 17 of the respective item of laundry 10 is or is not located in the respective loading clamp 15. For example, the means generates a signal when the respective loading clamp 15 has a corner 17. A lack of a signal indicates a free loading clamp 15. The means for establishing the occupancy of the respective loading clamp 15 can be configured in different ways, for example as a switch, a scanner, a sensor, a light barrier or a camera.

If, after a corner 17 is inserted into at least one loading clamp 15, a signal is generated, it is possible, for example, for a controller of the apparatus to be used to start the measuring operation of the length and/or the width of the front edge 18 of the item of laundry. It is preferably provided for each loading clamp 15 of the pair of loading clamps 14 or of the double clamp 19 to be assigned a means for detecting the occupancy and/or non-occupancy of the respective loading clamp 15. It is then expediently provided that the next step, for example the measurement of the length and/or width of the front edge 18, is started only when the means of the two loading clamps 15 detect the presence of a corner 17 of the front edge 18.

Figure 6:
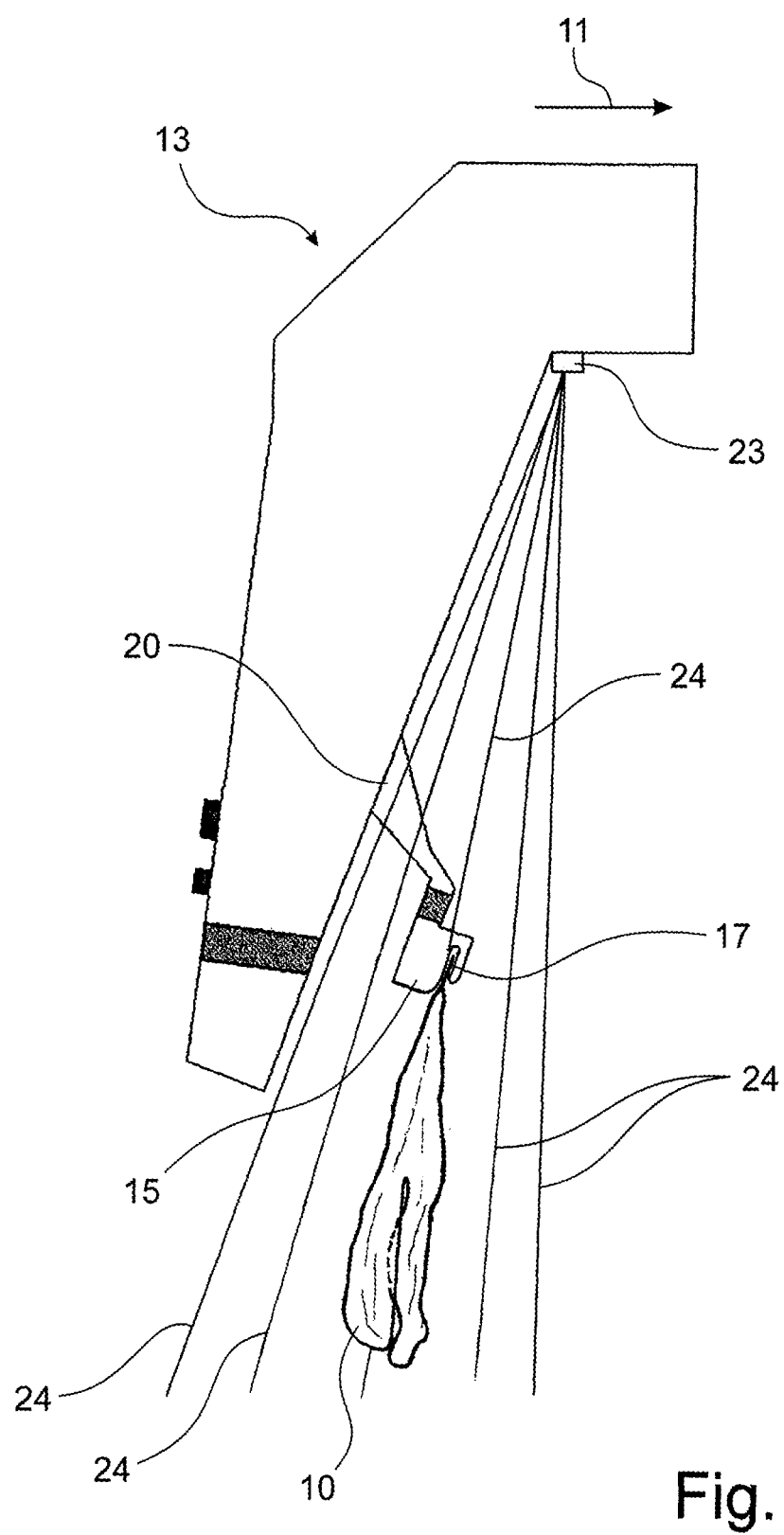
FIG. 6 shows a side view of the loading station according to FIG. 5 with a measuring device for determining a lowest point of a sag of the item of laundry hanging on loading clamps which are at a relatively large distance.

FIG. 6 illustrates a measuring device 23 operating or measuring contactlessly. The latter is located downstream of the conveyor for the movement back and forth of the carriage 20 carrying the pair of loading clamps 14 or the double clamp 19. The loading clamps 15 of the respective loading station 13 with the item of laundry 10 hanging thereon are thereby located in the region of influence of the contactless measuring device 23. The contactless measuring device 23 which is shown has at least one optoelectronic measuring means which forms a laser curtain with a vertical plane consisting of a multiplicity of laser beams 24, the plane preferably running centrally between the two loading clamps 15 in the feeding direction 11. The contactless measuring device 23 can optionally be pivotable about a horizontal axis running in the feeding direction 11, as a result of which the plane consisting of a multiplicity of laser beams 24 is slightly pivotable in relation to the vertical in order to be able to detect a lowest point 25 of the sag 22 of the front edge 18 of the item of laundry 10, said lowest point possibly not being located centrally between the adjacent loading clamps 15.

Instead of the laser curtain, other contactless measuring means are conceivable, for example a vertical laser strip or a sensor strip upstream and/or downstream of the item of laundry 10 hanging down from the two loading clamps 15 of the respective loading station 19. Sensor beams emanating from the sensor strip are then directed substantially perpendicularly to the plane of the illustration of FIG. 5, i.e., onto the front or rear side of the item of laundry 15 suspended on the two loading clamps 15, in order thus to be able to determine the lowest point 25 of the sag 22 of the front edge 18 of the item of laundry 10. Instead of the sensor strip, a line scan camera may also be provided. It is also conceivable to provide a sensor array or an at least two-dimensional, preferably digital, camera. Such contactless measuring devices can also be directed onto the front and/or rear side of the item of laundry 18 hanging down from the loading clamps 15 at the respective loading station 13. However, a camera may also be arranged between the two loading clamps 15 of the pair of loading clamps 14 above the sagging front edge 18 of the item of laundry 10 such that it is directed from above onto the lowest point 25 or at least approximately the lowest point 25 of the V-like sag 22 of the front edge 18 of the item of laundry 10.

An alternative exemplary embodiment, not shown, of the invention is conceivable, in which the distance between the two loading clamps 15 of the pair of loading clamps 14 is not invariable according to the exemplary embodiment of FIG. 5, but rather variable. The distance between the two loading clamps 15 of the respective pair of loading clamps 14 is, for example, variable by means of linear drives which move the two loading clamps 15 together or apart in opposite directions in the manner of the spreading clamps. However, it is also conceivable to design just one loading clamp 15 of the pair of loading clamps 14 to be displaceable in order to increase or to reduce the distance between the loading clamps 15. When the distance between the loading clamps 15 of the respective pair of loading clamps 14 is variable, in loading clamps 15 which have been brought together and are thereby at a small distance as previously customary, the respective item of laundry 10 is expediently suspended in said loading clamps by the respective operator 16 or else automatically or in a mechanized manner. The loading clamps 15 are then moved apart to the relatively great distance shown in FIG. 5 until the sag 22 obtains, for example, the V-like form illustrated in FIG. 5, in order then to determine the lowest point 25 or at least approximately the lowest point 25 at the lower apex of the sag 22 contactlessly, in particular optoelectronically.

The method according to the invention will be explained in more detail below with reference to the apparatus, configured as an insertion machine 9, of FIGS. 1 to 6 and the above description:

In this method, the width of the front edge 18, running transversely with respect to the feeding direction 11, of the item of laundry 10 is already determined in the region of the respective loading station 13, i.e., still upstream of the spreading device. For this purpose, the two loading clamps 15 of the pair of loading clamps 14 of each loading station 13 are at a distance which is increased in relation to previous apparatuses, namely insertion machines 9, in particular an increased clear distance. This distance is illustrated in FIG. 5 as distance A.

The lowest point 25 or approximately the lowest point 25 of the sag 22 is determined contactlessly, in particular optoelectronically, by the contactless measuring device 23. In the process, preferably digital data of at least the position of the lowest point 25 or in the vicinity thereof are obtained and placed into relation to an imaginary connecting line 26, in particular horizontal connecting line 26, which runs transversely with respect to the feeding direction 11 through the clamp jaws of the two loading clamps 15 of the respective pair of loading clamps 14 or of the double clamp 19. This connecting line 26 preferably extends through half the depth of the clamp jaws of the two loading clamps 15. From the distance of the lowest point 25 of the sag 22 of the front edge 18 or at least in the vicinity of the lowest point 25 from the horizontal connecting line 26 a depth of the sag 22 is produced at the time of the contactless determination of said lowest point 25 or at least of the approximately lowest point 25. This depth T is illustrated in FIG. 5. From the known increased distance, specifically the clear distance or the central distance between the loading clamps 15 of the pair of loading clamps 14 of the respective loading station 13, the length of the front edge 18 of the item of laundry 10 is at least approximately calculated computationally.

With reference to the length of the front edge 18 of the item of laundry 10 determined before the front edge 18 of the item of laundry 10 is stretched out by the spreading clamps of the spreading device in the region of the respective loading station 13, the spreading clamps can be moved apart in a targeted manner in order to spread out the front edge 18, in particular front transverse edge, of the item of laundry 10 and can center the item of laundry 10 upstream of the single track or the respective track of the mangle or of another laundry treatment machine.

If, instead of a constant, relatively large distance between the loading clamps 15 of the respective pair of loading clamps 14, a variable distance of the loading clamps 15 is provided, the adjacent corners 25 of the front edge 18 of a respective item of laundry 10 can be suspended in the loading clamps 15 which are located closely next to one another in the previous manner. Before the lowest point 25 of the item of laundry 10 is measured, the distance between the two loading clamps 15 is then increased such that they are at the distance A. The V-like sag 22 required for this purpose in the front edge 18 which has not yet been stretched is produced prior to the contactless measurement of the lowest point 25. Subsequently, the lowest point 25 can then be measured and the length or at least the approximate length of the front edge 18 of the respective item of laundry 10 then calculated in the above-described manner automatically upstream of the spreading device.

The respective item of laundry 10 can be easily and effortlessly suspended by the relevant operator 16 in the loading clamps 15, which are at an increased distance, because the increased distance of the loading clamps 15 corresponds approximately to the distance between the hands holding the adjacent corners 17 of the front edge 18 when the arms of the operator 16 are parallel.

The method is particularly suitable for items of laundry 10 to be treated unsorted, specifically both large and small items of laundry 10. The lowest point 25 of the sag of the front edge 18 of relatively large or largest items of laundry 10, what are referred to as king size items of laundry 10, can also be reliably determined contactlessly, in particular optoelectronically, before the spreading device stretches out the front edge 18 of the item of laundry 10 and the item of laundry 10 is spread out.

As a result of the increased distance between the loading clamps 15 of the respective pair of loading clamps 14 or of the double clamp 16, the item of laundry 10 is spread out in advance. The adjacent corners 17 of the front edge 18 of the item of laundry 10 then enter at a greater distance into the spreading clamps 18, as a result of which the spreading clamps 18 have to be moved less far apart in order to reduce the sag of the front edge 18 and to stretch out and spread same which shortens the operation of spreading and spreading out the respective item of laundry 10.

Figure 7:
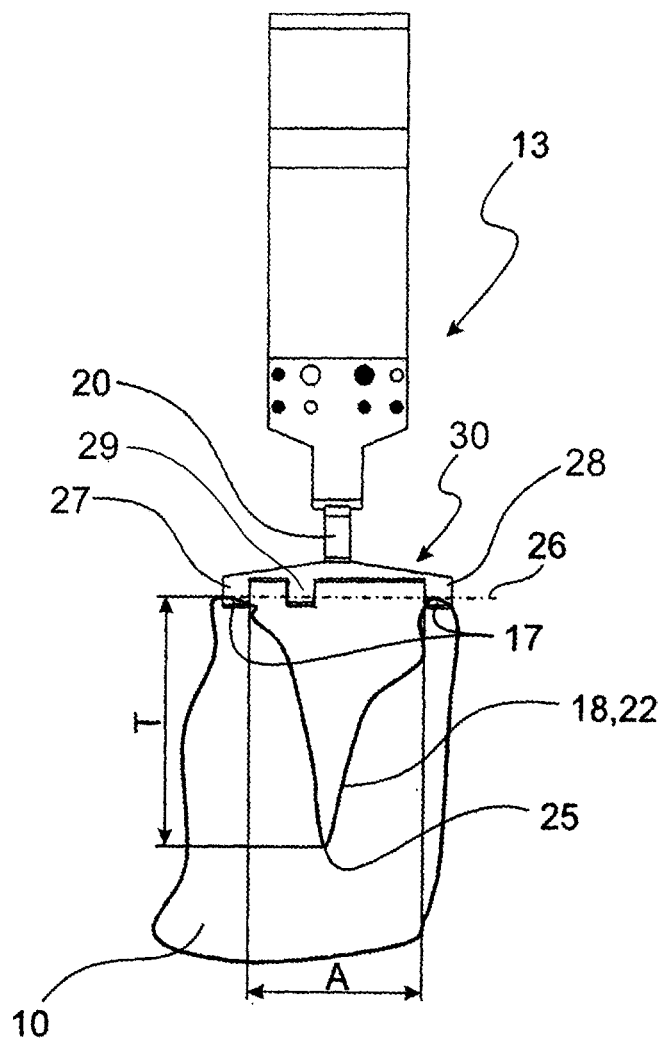
FIG. 7 shows a view analogously to FIG. 5 with an alternative exemplary embodiment with in each case three loading clamps collected together to form a group.

The illustration of FIG. 7 corresponds to that of FIG. 5. However, FIG. 7 shows an alternative exemplary embodiment of the invention with a differently configured loading clamp 27. Otherwise, this exemplary embodiment corresponds to that of FIGS. 1 to 6. Unless stated differently below, the description for the exemplary embodiment of FIGS. 1 to 6 corresponds to that of FIG. 7. Accordingly, for identical parts, FIG. 7 contains the same reference signs as are also contained in FIGS. 1 to 6.

The loading clamp 27 has three preferably identically configured loading clamps 27, 28 and 29. The three loading clamps 27, 28 and 29 are collected together to form a group and are fixedly connected to one another in order to form a multiple clamp, namely a triple clamp 30. As a result, the distances between the loading clamps 27, 28 and 29 are fixed with respect to one another, i.e., are invariable.

The distance "A" between the two outer loading clamps 27, 28 can be the same size as the distance A between the loading clamps 15 of the double clamps 19 illustrated in FIGS. 1 and 5. However, because of the third inner loading clamp 29 between the outer loading clamps 27 and 28, it is possible to increase the distance A between the outer loading clamps 27, 28 in the case of the triple clamp 30 shown in FIG. 7, specifically to up to 1½ times the distance A of FIG. 5. In the triple clamp 30 which is shown, the inner loading clamp 29 is located excentrically between the two outer loading clamps 27 and 28. This results in an excentric offset of the inner loading clamp 29, which may be as large as illustrated in FIG. 7, but may also be smaller such that the inner loading clamp 29 is only slightly offset from the center between the outer clamps 27 and 28. Alternatively, it is also conceivable to arrange the inner loading clamp 29 centrally between the outer loading clamps 27 and 28. The inner loading clamp 29 would then be a central loading clamp 29.

It is advantageous if at least the inner loading clamp 29 of the triple clamp 30, but preferably all three loading clamps 27, 28 and 29, has a means for detecting the presence or non-presence of a corner 17 of the front edge 18 of the item of laundry 10 in the respective loading clamp 27, 28 and 29.

Owing to the inner or optionally central loading clamp 29, even small items of laundry, for example serviettes, can be suspended in the triple clamp 30, the distance between adjacent corners 17 of the front edge 18 of said small items of laundry being so small that the adjacent corners 17 can no longer be suspended in the outer loading clamps 27, 28 since, for example, they are at a distance which is smaller than the distance A. Such smaller items of laundry 10 can then be suspended in the loading clamps 28 and 29, the distance between which is somewhat greater than the distance between the loading clamps 27 and 29. Even smaller items of laundry which cannot be suspended in the loading clamps 28 and 29 can be suspended in the loading clamp 29 and the outer loading clamp 27, which is spaced apart therefrom by a smaller amount, as a result of the excentricity of the inner loading clamp 29.

By means of the three loading clamps 27, 28, 29, it is therefore possible to suspend items of laundry 10 of different sizes, in particular also relatively small items of laundry 10, in the triple clamp 30 by selection of the suitable loading clamp 27, 28 or 28, 29 or 27, 29. By means of the detection means assigned to the loading clamps 27, 28 and 29, preferably all three loading clamps 27, 28 and 29, it can be determined in which loading clamps 27, 28 and/or 29 the respective item of laundry 10 hangs by adjacent corners 17 of the front edge 18. If, for example, it is established that the relevant item of laundry 10 is hanging in the inner loading clamp 29 and in one of the outer loading clamps 27 or 28 or both outer loading clamps 27, 28, conclusions can thereby be drawn regarding the size of the item of laundry 10. Optionally, if smaller items of laundry 10 are involved which are suspended or have to be suspended by one corner 17 in an inner clamp 29, a conclusion can be drawn regarding the size of the item of laundry 10. The starting point here is that items of laundry 10, the one corner 17 of which has to be suspended in the inner clamp 29, have a short front edge 18, the length of which does not have to be measured, for rapid spreading out by the spreading device, prior to the transfer to the spreading clamps of the spreading device. A measurement of the front edge 18 of the respective item of laundry 10 can then be limited to relatively large items of laundry 10 suspended in the outer loading clamps 27 and 28.

The method with triple clamps 30 basically proceeds precisely in the same manner as in the case of double clamps 19. In respect of the common features of the method, reference is made to that which is described in conjunction with the exemplary embodiment of FIGS. 1 to 6. In the case of the triple clamp 30, no measurement of the length and/or width of the front edge 18 of such an item of laundry 10 is required, the one corner 17 of which is suspended in an inner loading clamp 29, this being determined by means for establishing the occupancy.

Figure 8:
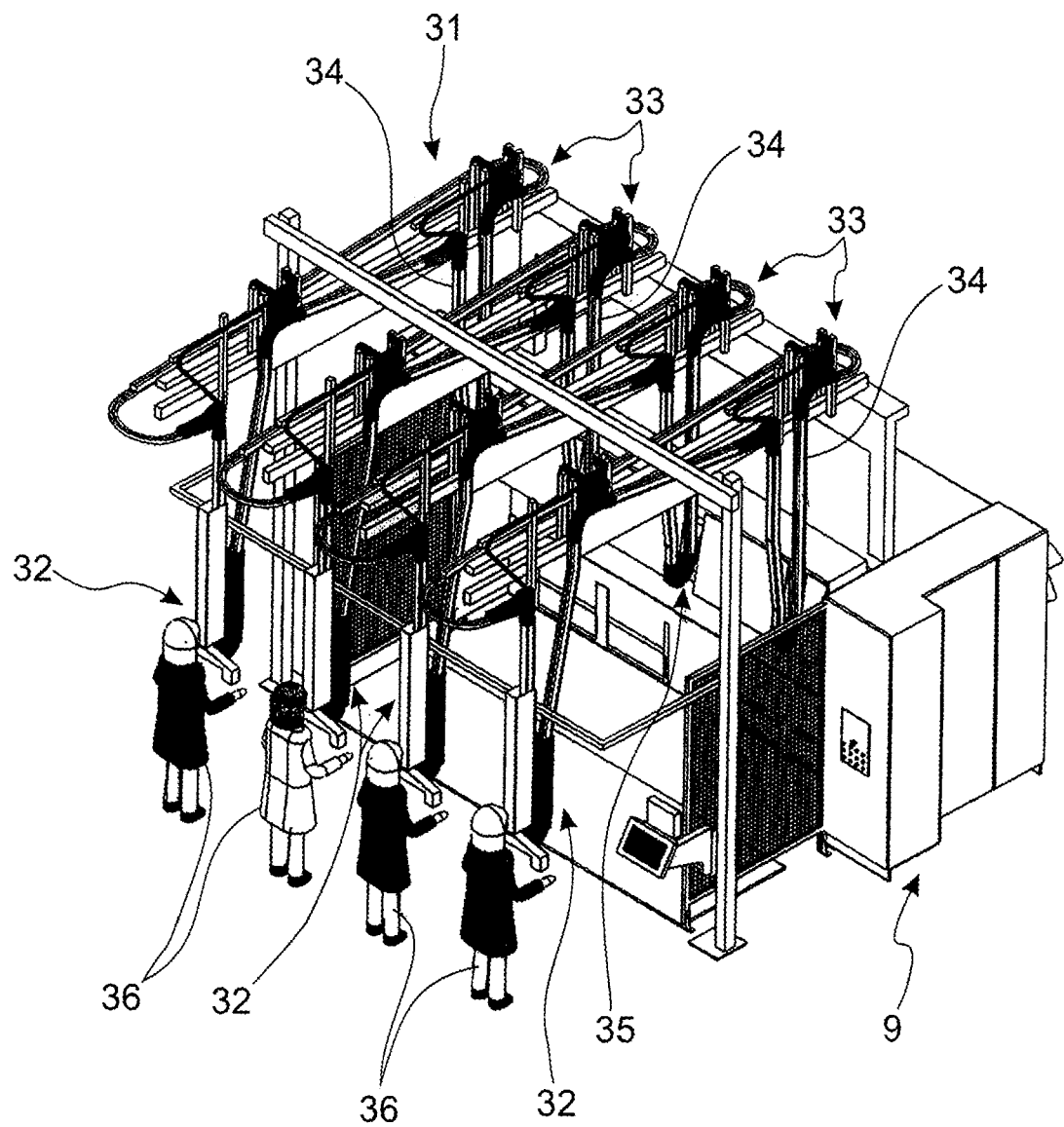
FIG. 8 shows a perspective view of an apparatus according to a different exemplary embodiment.

FIG. 8 shows an exemplary embodiment of the apparatus, in which a storage station 31 is arranged upstream of the insertion machine 9. Loading stations 32 are then provided at the start of the storage station 31. The loading stations 32 can be configured in the same way as the loading stations 13 upstream of the insertion machine 9 of the exemplary embodiment of FIGS. 1 to 7. The only difference is that the loading stations 32 are not arranged upstream of the insertion machine 9, but rather at the start of the storage station 31. The storage station 31 which is shown has four loading stations 32 arranged next to one another. All of the loading stations 32 are preferably of identical design. It is also conceivable for the storage station 31 to have a smaller or greater number of loading stations 32.

Each loading station 32 is followed by a storage section 33 of the storage station 31. All of the storage sections 33 are also preferably of identical design. In particular, they are identically long and/or are provided with an identical storage capacity. Located at the end of each storage section 33 is a transfer loop 34 which leads to a transfer station 35 at the start of the insertion machine 9. In the case of the apparatus shown in FIG. 8, the respective transfer station 35 replaces the loading station 13 of the apparatus according to FIGS. 1 to 7.

Each loading station 32 upstream of the storage station 31 has a conveying section on which at least one double clamp 19 or a triple clamp 30 is movable in the direction of the respective transfer station 35 of the insertion machine 9. In order to store a plurality of items of laundry 10 on the respective storage section 33, it is provided that the conveying section having a transport rail of each storage section 33 is assigned a plurality of preferably identical double clamps 19 shown in FIG. 8. Alternatively, triple clamps 30 may also be involved. The double clamps 19 or triple clamps 30, after being loaded with a respective item of laundry 10, are moved along the transport rail of the respective storage section 33 in the feeding direction 11 to the insertion machine 9. After the item of laundry 10 suspended on the respective double clamp 19 or triple clamp 30 is transferred to the spreading clamps of the spreading device of the insertion machine 9, the respective double clamp 19 or triple clamp 30 is transported back along the transport rail of the storage section 33 to the loading station 32 where a next item of laundry 10 can be suspended into the empty double clamp 19 or triple clamp 30 that is held ready. This suspension takes place in the exemplary embodiment of FIG. 8 by operators 36. Alternatively, it is, however, also conceivable for the adjacent corners 17 of the front edge 18 of the respective item of laundry 10 to be automatically suspended in the double clamps 19 or triple clamps 30.

LIST OF REFERENCE SIGNS

9 Insertion machine
10 Item of laundry
11 Feeding direction
12 Feed conveyor
13 Loading station
14 Pair of loading clamps
15 Loading clamp
16 Operator
17 Corner
18 Front edge
19 Double clamp
20 Carriage
21 Sag
22 Sag
23 Contactless measuring device
24 Laser beam
25 Lowest point
26 Connecting line
27 Loading clamp
28 Loading clamp
29 Loading clamp
30 Triple clamp
31 Storage station
32 Loading station
33 Storage section
34 Transfer loop
35 Transfer station
36 Operator

What is claimed is:

1. A method for feeding items of laundry (10) to a laundry machine, with opposite corners (17) of a front edge (18), running transversely with respect to the feeding direction (11), of a respective item of laundry (10) being suspended in two loading clamps (15; 27, 28, 29) from which the item of laundry (10) is transferred to spreading clamps, which are movable transversely with respect to the feeding direction (11), of a spreading device or is taken over by the spreading clamps, the spreading clamps are moved apart in order to spread out the item of laundry (10) by stretching the front edge (18) of same, and the spread-out item of laundry (10) is deposited by the spreading clamps on a depositing strip or on a feed conveyor (12) which transports the spread-out item of laundry (10) to another laundry machine, wherein the two loading clamps (15; 27, 28, 29) holding the opposite corners (17) of the respective item of laundry (10) are at such a large or relatively large distance (A) from one another or can be brought to such a distance (A) from one another that, when the item of laundry (10) is hanging down from the two loading clamps (15; 27, 28, 29), a V-like sag (22) of the front edge (18) forms, an at least approximately lowest point (25) of the V-like sag (22) is contactlessly determined and the length of the sagging front edge (18) of the item of laundry (10) is derived therefrom, wherein at the distance (A) between the loading clamps (15) that exists when the sag (22) is measured, the item of laundry is transferred to the spreading clamps or is taken over by the spreading clamps from the loading clamps (15; 27, 28, 29).

2. The method as claimed in claim 1, wherein the lowest point (25) of the sag (22) of the front edge (18) of the item of laundry (10) hanging down from the loading clamps (15; 27, 28, 29) is contactlessly measured.

3. The method as claimed in claim 1, wherein the lowest point (25) of the sag (22) of the front edge (18) of the item of laundry (10) hanging down from the loading clamps (15; 27, 28, 29) is measured by at least one measuring device (23) carrying out contactless measurements.

4. The method as claimed in claim 1, wherein the distance of the determined lowest point (25) or of the at least approximately lowest point (25) of the V-like sag (22) of the front edge (18) of the item of laundry (10) from an imaginary straight connecting line (26) through the adjacent loading clamps (15; 27, 28, 29) respectively holding one of the opposite corners (17) of the V-like sagging front edge (18) of the respective item of laundry (10) is determined and, from this, taking into account the known relatively large or increased distance between the two loading clamps (15; 27, 28, 29), the length of the front edge (18) is determined.

5. The method as claimed in claim 1, wherein opposite corners (17) of the front edge (18) of the respective item of laundry (10) are suspended in the loading clamps (15; 27, 28, 29) by at least one operator (16; 36) or automatically by means of a handling device.

6. The method as claimed in claim 1, wherein the distance (A) between the loading clamps (15; 27, 28, 29) holding the opposite corners (17) of the respective item of laundry (10) is smaller during the loading or receiving of the corners (17) than during the contactless determination of the V-like sag (22) of the front edge (18) of the item of laundry (10) or of the at least approximately lowest point (25) of the V-like sag (22).

7. The method as claimed in claim 1, wherein opposite corners (17) of the front edge (18) of the respective item of laundry (10) are suspended in two loading clamps (15) of a pair of loading clamps (14) or in two loading clamps (27, 28, 29) of a group of at least three loading clamps (27, 28, 29).

8. The method as claimed in claim 1, wherein it is determined in which loading clamp (15; 27, 28, 29) a corner (17) of the front edge (18) of the item of laundry (10) is suspended.

9. The method as claimed in claim 8, wherein it is determined by a sensor or feeler in which loading clamp (15; 27, 28, 29) a corner (17) of the front edge (18) of the item of laundry (10) is suspended.

10. The method as claimed in claim 1, wherein the laundry machine is a mangle.

11. An apparatus for feeding items of laundry (10) to a laundry machine, having at least one loading station (13) having at least two loading clamps (15; 27, 28, 29), a spreading device which has spreading clamps movable transversely with respect to a feeding direction (11), and at least one feed conveyor (12) transporting the items of laundry (10) in the feeding direction (11) to another laundry treatment device, wherein the two loading clamps (15; 27, 28, 29) of the or each loading station (13) are at such a large distance from one another or can be brought to such a distance that, when the respective item of laundry (10) is hanging by opposite corners (17) of a front edge (18) on the loading clamps (15; 27, 28, 29), a V-like sag (22) of the front edge (18) of the item of laundry (10) arises, and at least one contactless measuring device (23) is provided by means of which a lowest point (25) or at least approximately the lowest point (25) of the V-like sag (22) can be determined, wherein loading clamps (15) holding the opposite corners (17) of the respective item of laundry (10) and being at a fixed distance (A) are assigned to a double clamp (19) or form such a double clamp.

12. The apparatus as claimed in claim 11, wherein the loading clamps (15), holding the opposite corners (17) of the respective item of laundry (10), of the or each loading station (13) are at a fixed distance.

13. The apparatus as claimed in claim 12, wherein the loading clamps (15), holding the opposite corners (17) of the respective item of laundry (10), of the or each loading station (13) are at a fixed distance which is 350 mm to 600 mm or 400 mm to 500 mm.

14. The apparatus as claimed in claim 11, wherein loading clamps (15), holding the opposite corners (17) of the respective item of laundry (10), of the or each loading station (13) are at a variable distance from one another.

15. The apparatus as claimed in claim 14, wherein loading clamps (15), holding the two opposite corners (17) of the respective item of laundry (10), of the or each loading station (13) are at a variable distance from one another which is smaller than 350 mm and is at maximum up to 600 mm.

16. The apparatus as claimed in claim 11, wherein each loading station (13) has a group with at least three loading clamps (27, 28, 29).

17. The apparatus as claimed in claim 16, wherein the loading clamps (15) of the respective group are arranged on a multiple clamp or form such a multiple clamp.

18. The apparatus as claimed in claim 17, wherein the respective multiple clamp has two outer loading clamps (27, 28) and at least one inner loading clamp (29) arranged in between, wherein the outer loading clamps (27, 28) are assigned at an invariable distance from one another in a fixed position to the multiple clamp, and the at least one inner loading clamp (29) is assigned to the multiple clamp at variable distances with respect to the outer loading clamps (27, 28).

19. The apparatus as claimed in claim 16, wherein at least one of the loading clamps (15; 27, 28, 29) has a sensor or scanner for determining the presence or non-presence of a corner (17) of the front edge (18) of the respective item of laundry (10) in the relevant loading clamp (15; 27, 28, 29).

20. The apparatus as claimed in claim 11, wherein the laundry machine is a mangle.

21. An apparatus for feeding items of laundry (10) to a laundry machine, having at least one loading station (13) having loading clamps (27, 28, 29), a spreading device which has spreading clamps which are movable transversely with respect to a feeding direction (11), and at least one feed conveyor (12) transporting the items of laundry (10) in the feeding direction (11) to another laundry treatment device, wherein each loading station (13) has a group with at least three loading clamps (27, 28, 29), wherein at least one of the loading clamps (15; 27, 28, 29) has a sensor or scanner for determining the presence or non-presence of a corner (17) of the front edge (18) of the respective item of laundry (10) in the relevant loading clamp (15; 27, 28, 29).

22. The apparatus as claimed in claim 21, wherein the loading clamps (15) of the respective group are arranged on a multiple clamp or form such a multiple clamp.

23. The apparatus as claimed in claim 22, wherein the respective multiple clamp has two outer loading clamps (27, 28) and at least one inner loading clamp (29) arranged in between, wherein the outer loading clamps (27, 28) are assigned at an invariable distance from one another in a fixed position to the multiple clamp, and the at least one inner loading clamp (29) is assigned to the multiple clamp at variable distances with respect to the outer loading clamps (27, 28).

24. The apparatus as claimed in claim 23, wherein the outer loading clamps (27, 28) of the or each multiple clamp are at a fixed distance with respect to one another which is 350 mm to 600 mm or 400 mm to 500 mm.

25. The apparatus as claimed in claim 21, wherein the laundry machine is a mangle.

\* \* \* \* \*